(12) United States Patent
Moncomble (10) Patent No.: US 11,038,987 B2
(45) Date of Patent: Jun. 15, 2021

(54) AUTOMATIC ACTIVATION OF THE CONFIGURATION OF A COMMUNICATION TERMINAL

(71) Applicant: ORANGE, Paris (FR)

(72) Inventor: Ghislain Moncomble, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/481,315

(22) PCT Filed: Jan. 25, 2018

(86) PCT No.: PCT/FR2018/050173
§ 371 (c)(1),
(2) Date: Jul. 26, 2019

(87) PCT Pub. No.: WO2018/138442
PCT Pub. Date: Aug. 2, 2018

(65) Prior Publication Data
US 2020/0186621 A1     Jun. 11, 2020

(30) Foreign Application Priority Data
Jan. 27, 2017   (FR) ...................................... 1750670

(51) Int. Cl.
*H04L 29/08*          (2006.01)
(52) U.S. Cl.
CPC .............. *H04L 67/34* (2013.01); *H04L 67/22* (2013.01); *H04L 67/306* (2013.01)

(58) Field of Classification Search
CPC ....... H04L 67/34; H04L 67/22; H04L 67/306; H04L 67/02; H04L 63/0428; H04L 63/10;
(Continued)

(56) References Cited

U.S. PATENT DOCUMENTS

2004/0128389 A1*  7/2004 Kopchik ................. G06F 21/34
                                                           709/228
2007/0283049 A1* 12/2007 Rakowski ........... G06F 9/44505
                                                           709/246

(Continued)

OTHER PUBLICATIONS

Paul, Ian, "Apple saves iPhone call history to iCloud, but barely mentions it", MacWorld.com, Nov. 17, 2016, p. 1-5.
(Continued)

*Primary Examiner* — Caroline H Jahnige
(74) *Attorney, Agent, or Firm* — David D. Brush; Westerman, Champlin & Koehler, P.A.

(57) ABSTRACT

A method of automatically activating a configuration of a communication terminal, which is customised according to a current user of the terminal. The method implements the following: identifying, at a current time, the current user in possession of the terminal; retrieving parameterization information of the terminal which has been predefined by the identified current user; retrieving usage data of at least one communication terminal having been used by the current user prior to the current time, according to the retrieved parameterization information of the terminal; and configuring the terminal that the current user has in possession, using the retrieved usage data.

10 Claims, 6 Drawing Sheets

(58) Field of Classification Search
CPC ... H04L 41/0806; H04L 67/141; H04L 67/14; H04L 67/303; H04M 2203/557; H04M 3/42263; H04M 3/42178
See application file for complete search history.

(56) References Cited

U.S. PATENT DOCUMENTS

2013/0254685 A1    9/2013   Batraski et al.
2014/0215602 A1*   7/2014   Chuaprasort ....... H04L 63/0876
                                                         726/20
2015/0215398 A1*   7/2015   Chang ................... G06F 16/957
                                                          726/8

OTHER PUBLICATIONS

English translation of the Written Opinion of the International Searching Authority dated Jul. 30, 2019 for corresponding International Application No. PCT/FR2018/050173, filed Jan. 25, 2018.
International Search Report dated Apr. 24, 2019 for corresponding International Application No. PCT/FR2018/050173, filed Jan. 25, 2018.
Written Opinion of the International Searching Authority dated Apr. 24, 2019 for corresponding International Application No. PCT/FR2018/050173, filed Jan. 25, 2018.

* cited by examiner

AUTOMATIC ACTIVATION OF THE CONFIGURATION OF A COMMUNICATION TERMINAL

CROSS-REFERENCE TO RELATED APPLICATIONS

This Application is a Section 371 National Stage Application of International Application No. PCT/FR2018/050173, filed Jan. 25, 2018, which is incorporated by reference in its entirety and published as WO 2018/138442 A1 on Aug. 2, 2018, not in English.

FIELD OF THE INVENTION

The present invention relates to the field of customizing multiple communication terminals intended to be used by one and the same user or else intended to be shared between a plurality of users.

The invention may in particular be implemented in a communication terminal equipped with a user interface, with a graphical interface and with a module for accessing a communication network, for example a tablet, a mobile telephone, a smartphone, a personal computer, a television connected to a communication network, etc.

The invention applies more particularly to the automatic activation of the configuration of a communication terminal, which configuration is customized depending on a current user of this terminal.

PRESENTATION OF THE PRIOR ART

Currently, in a first usage context in which a user possesses a plurality of different communication terminals, some of which may be shared between a plurality of users, the user generally customizes each terminal differently. For example, assuming that the user possesses two communication terminals, he will choose for example:

- to configure a particular wallpaper for a first terminal that is personal to him and another particular wallpaper for a second terminal that is shared with other users;
- to configure a particular incoming call notification mode for the first terminal and another particular incoming call notification mode for the second terminal;
- to install and to use particular software or applications for the first terminal and particular software or applications for the second terminal, some of this software or some of these applications being able to be common to the first and second terminals;
- to use an Internet browser of a first type on the first terminal and to use this same Internet browser as well as an Internet browser of a second type on the second terminal;

etc.

There are situations in which the user might wish to recover, on a first terminal that he is currently using at the current time, all or some of the configuration elements of a second terminal that he used before the current time (calls, messages, favorite Internet links, browsing histories and cookies, etc.). In a first scenario, let us consider the case in which, for example, before the current time, a user who connected to a social network application on the second terminal wishes to continue his discussion on the first terminal that he possesses at the current time. In this situation, either this application is already installed on the first terminal and the user still has to manually reconnect to this application by providing identification data, or this application is not installed on the first terminal, and the user has to install it on the first terminal before connecting thereto. Such an operation is inflexible, complicated and takes time. In a second scenario, let us consider the case in which, for example, before the current time, a user who connected to various websites of interest to him using the second terminal is not able, when he starts to use the first terminal at the current time, to benefit from advertising profiling that takes into account information that he looked up previously on these websites. Thus, given the fact that the user uses various terminals, the advertising profiling of this user is not effective, which leads to poor matching between the products or services desired by the current user and the offerings from the advertisers.

In the context of a communication terminal shared between a plurality of users, the abovementioned drawbacks arise. For example, the advertising profiling is also not effective due to the marketing tools taking into account the combination of criteria resulting from various profiles that do not necessarily have the same expectations. For example, in the case of a terminal use of which is shared by the various members of one and the same family, a child will tend, at a current time, to look up music, sport and cartoon websites, and at a following time, an adult of the family who is using the terminal will be offered customized adverts on the subjects looked up previously by the child. By contrast, an adult will tend, at a current time, to look up websites linked to his needs, and at a following time, a child of the family who is using the terminal will be offered customized adverts on the subjects looked up previously by the adult. The latter type of advertising profiling may furthermore be harmful to the child if the information that is offered is of an inappropriate nature.

Still in the context of a shared communication terminal, customized configuration proves even more difficult due to confidentiality problems that are liable to arise with regard to the disclosure of data specific to each user. Specifically, a user who is using a shared terminal at the current time is liable to be able to connect to applications or web services for which another user has previously authenticated themselves at a time preceding the current time and if this other user has forgotten to disconnect therefrom.

Lastly, whether the communication terminal is shared or not, another drawback of terminal customizations that are currently offered is that they do not allow a user who does not wish to keep Internet usage histories, cookies, calls and/or messages, coordinates, etc. that relate to certain websites and/or applications on a terminal under consideration to automatically select this information for the purpose of deleting it. Currently, the user does not have any other choice than either to delete the entire history of the terminal in question or to manually delete each of the unwanted links, this often taking a very long time, once the means for performing this operation is known, for example via the history of the Internet browser that is used.

AIM AND SUMMARY OF THE INVENTION

One of the aims of the invention is to rectify drawbacks of the abovementioned prior art.

To this end, one subject of the present invention relates to a method for automatically activating the configuration of a communication terminal that is customized depending on a current user of the terminal.

Such a method is noteworthy in that it implements the following:

identifying, at a current time, the current user in possession of the terminal, recovering settings information, which has been predefined by the identified current user, of the terminal, recovering usage data of at least one communication terminal having been used by the current user before the current time, depending on the recovered settings information of the terminal, configuring the terminal that the current user has in his possession with the recovered usage data.

Such a provision thus allows a user in possession, at a current time, of a communication terminal that either belongs exclusively to him or is shared by other users to recover, on this terminal, usage data specific to the user and that were generated at a time preceding the current time, either on at least one other terminal belonging exclusively to the user or on said terminal. The recovery of such usage data is implemented by virtue of a setting predetermined by the user, said setting defining recovery rules for these usage data.

Usage data of at least one communication terminal is understood to mean hereinafter all of the elements to which a user has access when he uses a communication terminal or else Internet access means contained in said terminal, such as an Internet browser.

Such data non-exhaustively comprise:
the wallpaper, and/or
the contact list, and/or
the outgoing/received call history, and/or
the outgoing/received SMS message history, and/or
favorite Internet links, and/or
access data for accounts of the current user, and/or
Internet usage history data generated when using Internet services, such as for example electronic mail, online retail, video on demand, or else generated when browsing the Web.

Thus, by virtue of the invention, the user of a terminal is able to automatically recover, on the terminal that he is using at the current time, data that are deemed to be not very confidential or not confidential, but also data that are deemed to be confidential, such as access data for one or more of his accounts or else all or some of the Internet usage history data generated at a previous time on another terminal, or else all or some of the data generated when the user was browsing the Web.

If the terminal that is in the possession of the current user at the current time and if the terminal that was used by the current user at a time preceding the current time are both terminals belonging exclusively to the current user, the invention advantageously makes it possible to guarantee continuity of the profiling of the current user for commercial purposes or of the targeted advertising for said user, even though the user has changed terminal. In this way, even after having changed terminal, the user benefits from the display of customized adverts on the terminal that he is currently using at the current time.

According to one particular embodiment, throughout the entire duration of use of the terminal by the current user, the following is implemented:

analyzing the actions of the current user in relation to the terminal, for a given action, recovering or not recovering an item of usage data of the terminal corresponding to the given action and to the support means for this action, in association with the time at which the action was implemented, depending on the recovered settings information of the terminal.

Such a provision advantageously makes it possible to have automated and centralized tracking of the actions of the user on the terminal throughout the entire duration of use of the terminal. Such tracking is advantageously tailored to the preferences of the user, as it applies only to the actions that the user has mentioned in the previous setting.

According to another particular embodiment, if a previous user, different from the current user, has used the terminal before the current time, the following is implemented:

recovering settings information, associated with the previous user, of the terminal, recovering usage data of the terminal having been used by the previous user, depending on the recovered settings information of the terminal, applying confidentiality processing to the recovered usage data depending on the recovered settings information of the terminal.

Such a provision furthermore makes it possible, if the terminal in the possession of the current user at the current time is a terminal that is shared by other users and the terminal has been used by a user different from the current user at a time preceding the current time, to provide the current user with a customized configuration of the terminal, while at the same time affording confidentiality of the usage data specific to the previous user.

According to yet another particular embodiment, when the previous user has been identified before the recovery of the settings information, associated with the previous user, of the terminal, the recovered settings information is information predefined by said previous user.

Since the user is identified beforehand, such a provision makes it possible to recover a profile of the previous user that is customized in accordance with his preferences by virtue of recovering settings information that was predefined by the previous user. Furthermore, the application of the confidentiality processing will advantageously be applied to the usage data of this profile, and therefore in accordance with the preferences of the previous user that are defined beforehand in the settings information.

According to yet another particular embodiment, when the previous user has not been identified before the recovery of the settings information, associated with the previous user, of the terminal, the settings information associated with the previous user is established beforehand by default.

Such a provision advantageously makes it possible, by virtue of the recovery of settings information defined beforehand by default, to apply confidentiality processing to all or some of the usage data associated with the previous user, in particular usage data having a highly confidential nature.

According to yet another particular embodiment, the confidentiality processing applied to the recovered usage data of the previous user implements the following:

copying all or some of the recovered usage data into a storage space associated with the previous user, and/or deleting all or some of the recovered usage data from the terminal, and/or disconnecting the previous user from all or some of the secure resources that the previous user accessed.

Such a provision advantageously makes it possible to keep, transparently for the previous user, his usage data, for the purpose of being recovered on the next terminal that he will use.

Moreover, the confidentiality processing applied to the usage data of the previous user is particularly flexible and suited to the wishes of the previous user when it depends on the settings information that has been predefined by the previous user. Thus, during such setting, the user will indicate beforehand the usage data that he wants to see copied, the usage data that he wants to see deleted, and the resources that he wants to see disconnected.

Secure resources are understood to mean content, applications or else Internet services requiring user access through authentication of said user. The settings information then consists of the various authentication data required to access this content, these applications or these services. The user may decide on a content-by-content, application-by-application or else service-by-service basis whether or not he communicates the corresponding authentication data.

According to yet another particular embodiment, at least some of the usage data of the terminal having been used by the previous user that have been recovered are selected from settings information, associated with the previous user, of the terminal in order to configure the terminal in the operating state in which said terminal was when the previous user finished using it at a time preceding the current time.

Such a provision advantageously makes it possible to replay, on the terminal in the possession of the current user at the current time, all or some of the actions implemented previously by the previous user, when said previous user was in possession of the terminal at a time preceding the current time. A particular action is replayed according to the authorizations contained in the settings information associated with the previous user.

According to yet another particular embodiment, for each item of usage data, having been used by the previous user and that has been recovered, of the terminal, the following is implemented:
  selecting an item of usage data from the settings information, associated with the previous user, of said terminal,
  configuring the terminal with said selected item of usage data in the operating state in which the terminal was when the previous user finished using it at a time preceding the current time, only if the use of one and the same item of usage data of the terminal is required by the current user,
  applying confidentiality processing to said selected item of usage data.

Such a provision advantageously makes it possible to replay, on a case-by-case basis on the terminal in the possession of the current user at the current time, the actions implemented previously by the previous user when he was in possession of the terminal at a time preceding the current time, only when they are of the same type as the actions required by the current user. For example, if the current user launches one Internet browser from among several available ones on the terminal, only the browsing history specific to this Internet browser and associated with the previous user will be activated, starting from the time at which this activation was authorized by the previous user in the settings information associated with him. Confidentiality processing will then be applied to the browsing history of the previous user, such as for example copying the browsing history into a storage space associated with the previous user, and/or deleting this browsing history from said terminal.

According to yet another particular embodiment, for any current or previous user under consideration, when recovering the usage data, at least some usage data are configured in a format that is able to be used by the terminal at the current time.

Such a provision makes it possible, when usage data have been generated before the current time by a support means of a communication terminal that is different from the support means of this same communication terminal or of another communication terminal that are able to generate these usage data at the current time, to make these usage data compatible with use thereof at the current time.

According to yet another particular embodiment, for any current or previous user under consideration, the settings information associated with the user under consideration differs according to the type of terminal liable to be used by the user under consideration.

Such a provision allows a user to predefine settings information regarding his usage data that is different according to the terminal that he is liable to use. For example, the user will predefine more flexible settings information in association with a terminal that he uses with exclusivity, in other words that he does not share with other users. By contrast, he will predefine more constrictive settings information in association with a terminal that he shares with other users. When this involves settings information that is established beforehand by default, said settings information may also be different depending on the type of terminal.

The various abovementioned embodiments or implementation features may be added, independently or in combination with one another, to the automatic activation method such as defined above.

The invention also relates to a device for automatically activating the configuration of a communication terminal, which configuration is customized depending on a current user of the terminal.

Such an automatic activation device is noteworthy in that it comprises a processing circuit that is designed to:
  identify, at a current time, the current user in possession of the terminal,
  recover settings information, which has been predefined by the identified current user, of the terminal,
  recover usage data of at least one communication terminal having been used by the current user before the current time, depending on the recovered settings information of the terminal,
  configure the terminal that the current user has in his possession with the recovered usage data.

The invention also relates to a communication terminal containing the abovementioned automatic activation device.

The invention also relates to a computer program for implementing program code instructions in order to execute the steps of the automatic activation method according to the invention when the program is executed in an automatic activation device.

Such a program may use any programming language, and be in the form of source code, object code, or of intermediate code between source code and object code, such as in a partially compiled form, or in any other desirable form.

The invention also relates to a computer-readable recording medium on which there is recorded a computer program, this program including instructions designed to implement the steps of the automatic activation method according to the invention when the program is executed in an automatic activation device such as mentioned above.

The recording media may be any entity or device capable of storing the program. For example, the medium may include a storage means, such as a ROM, for example a CD-ROM or a microelectronic circuit ROM, a USB key or a magnetic recording means, for example a hard disk.

Moreover, the recording medium may be a transmissible medium such as an electrical or optical signal, which may be conveyed via an electrical or optical cable, by radio or by other means. The program according to the invention may in particular be downloaded from an Internet network.

As an alternative, the recording medium may be an integrated circuit in which the program is incorporated, the circuit being designed to execute or to be used in the execution of the abovementioned automatic activation method.

LIST OF THE FIGURES

Other advantages and features of the invention will become more clearly apparent on reading the following description of a plurality of particular embodiments of the invention, given by way of simple illustrative and non-limiting example, and of the appended drawings, among which.

DESCRIPTION OF PARTICULAR EMBODIMENTS OF THE INVENTION

Figure 1A:
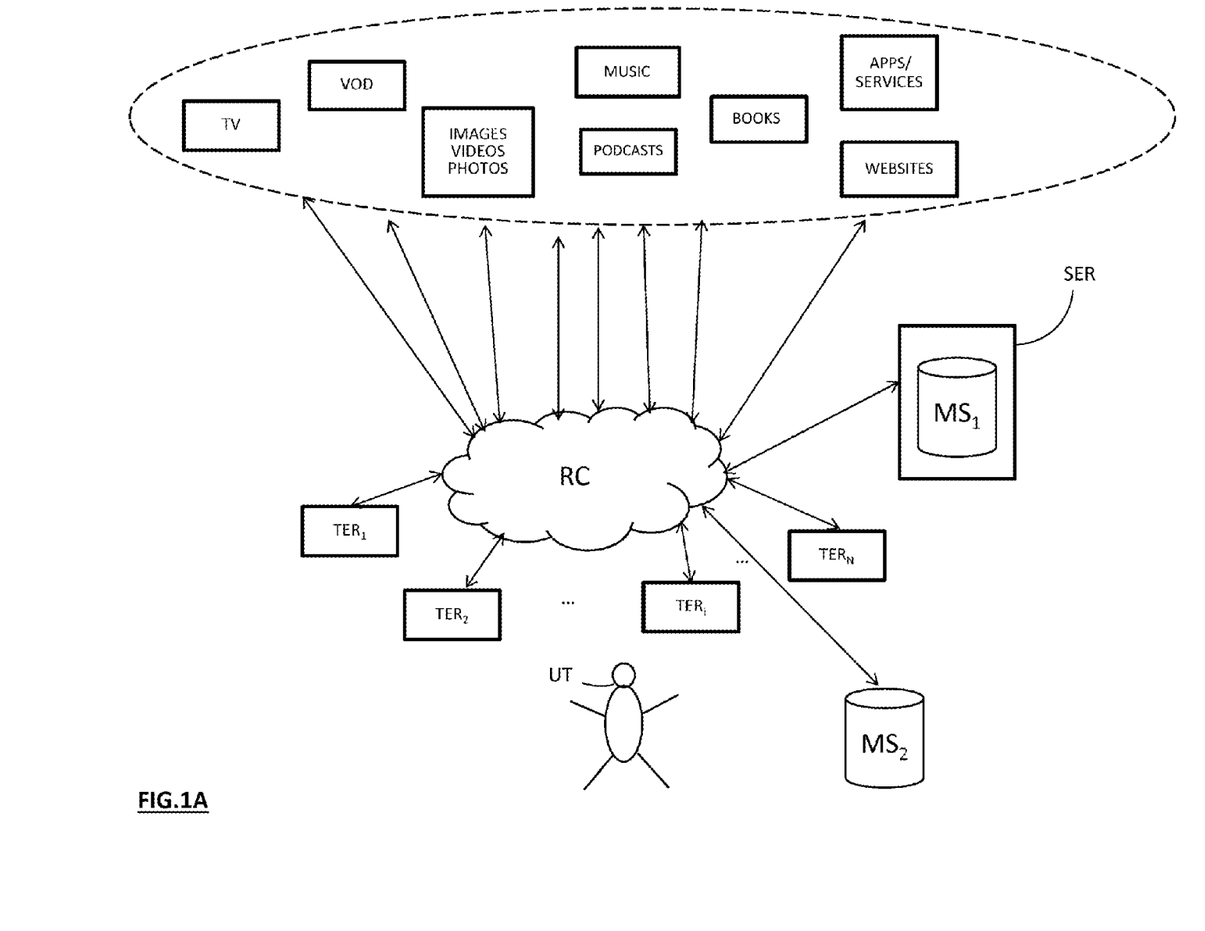
FIG. 1A schematically shows a first usage context in which the method for automatically activating a communication terminal is implemented, according to the invention.

With reference to FIG. 1A, what is shown is a first usage context in which the method for automatically activating the configuration of a communication terminal according to the invention is implemented.

In this first usage context, a user UT has a plurality of communication terminals $TER_1, TER_2, \ldots, TER_i, \ldots, TER_N$, such that $1 \leq i \leq N$, of which he has exclusive use. Each of these terminals is able to access various secure or unsecure resources, via a communication network RC, such as for example of IP (abbreviation for "Internet Protocol") type. Such resources are non-exhaustively:
- content offered by a service platform, via a communication network RC, such as for example television content TV, in particular content scheduled to be broadcast in a programming schedule, VOD catalogs, video and/or image and/or photo catalogs, music catalogs, podcast catalogs, digital book catalogs, application and/or service catalogs,
- accounts of the user UT associated respectively with applications installed on all or some of the terminals $TER_1, TER_2, \ldots, TER_i, \ldots, TER_N$,
- freely accessible or secure Internet services, such as for example the electronic mail of the user UT, online retail, online weather, online trading, etc.

Furthermore, in this first usage context, the user UT is allowed to set elements specific to the terminal itself according to his usage preferences. By way of non-exhaustive example, the user is able:
- to configure a particular wallpaper for a given terminal that he uses more often than another one, and particular other wallpapers for the other terminals, either respectively or jointly;
- to configure a particular incoming call notification mode for the terminal that he uses most often and particular other incoming call notification modes for the other terminals, either respectively or jointly;
- to create a particular contact group in the directory of the terminal that he uses most often, and a particular other contact group in the directory of each of the other terminals, either respectively or jointly;
- to install particular software or applications for the terminal that he uses most often and other particular software or applications on the other terminals, some of this software or some of these applications being able to be common to all or some of said terminals;
- to install at least one Internet browser of a first type on the terminal that he uses most often and at least one Internet browser of a second type on all or some of the other terminals;
- to create particular favorite Internet links on the terminal that he uses most often and other particular favorite Internet links on the other terminals, some of these favorite Internet links being able to be common to all or some of said terminals;
- etc.

Each of the abovementioned terminals comprises means for connecting to the communication network RC, via for example a local area network (not shown), which is for example wireless, in particular of Wi-Fi or PLC (abbreviation for "power line communication") type. As a variant, the connection means are for example of x-DSL, fiber or else 3G and 4G type.

The set of terminals $TER_1, TER_2, \ldots, TER_i, \ldots, TER_N$ non-exhaustively comprises for example:
- at least one mobile telephone, and/or
- at least one smartphone, and/or
- at least one tablet, and/or
- at least one portable computer, and/or
- at least one personal computer of PC type, and/or
- a connected television,
- etc.

Figure 1B:
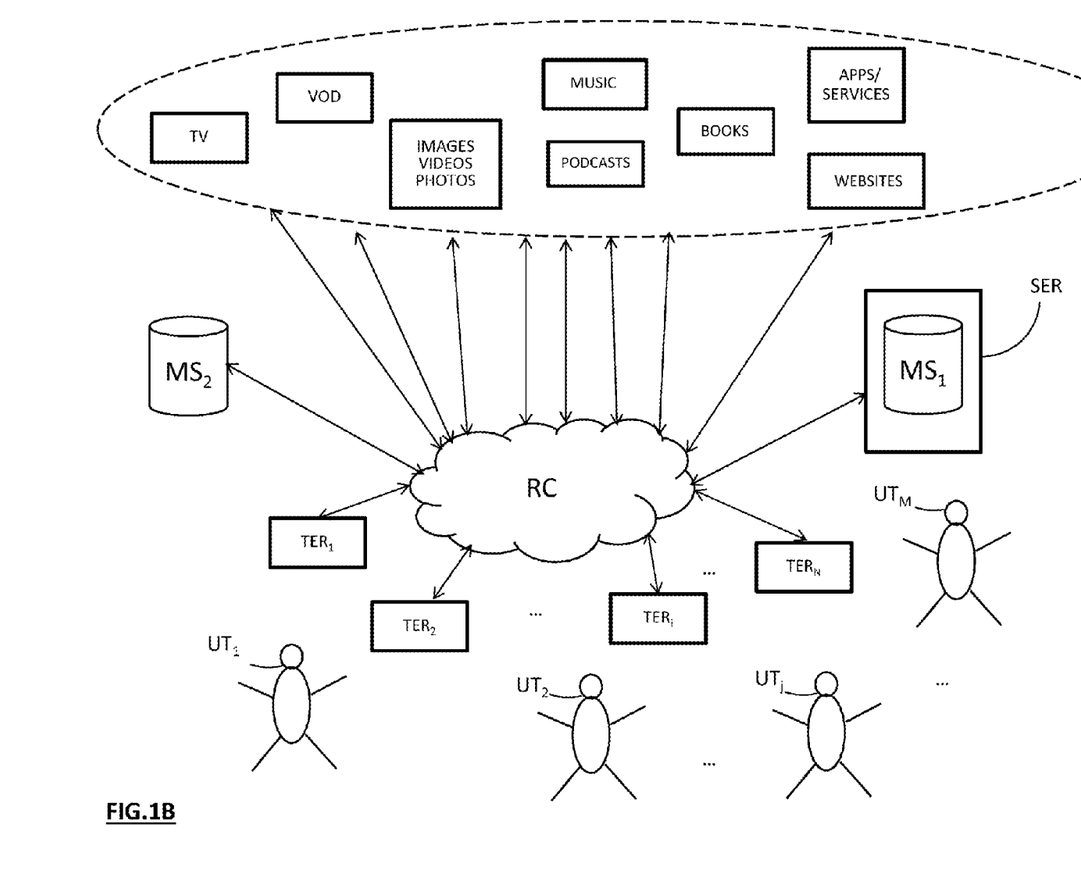
FIG. 1B schematically shows a second usage context in which the method for automatically activating a communication terminal is implemented, according to the invention.

With reference to FIG. 1B, what is now shown is a second usage context in which the method for automatically activating the configuration of a communication terminal according to the invention is implemented.

In this second usage context, a plurality of users $UT_1, UT_2, \ldots, UT_j, \ldots, UT_M$, such that $1 \leq j \leq M$, share the use of all or some of said terminals $TER_1, TER_2, \ldots, TER_i, \ldots, TER_N$.

Non-exhaustively, the users $UT_1, UT_2, \ldots, UT_j, \ldots, UT_M$ are the members of one and the same family, the employees in a business, the members of a community, the residents of one and the same town, etc.

In this second usage context, each of the users $UT_1, UT_2, \ldots, UT_j, \ldots, UT_M$ is allowed to access various secure or unsecure resources, such as those already described with reference to FIG. 1A, using one of the terminals $TER_1, TER_2, \ldots, TER_i, \ldots, TER_N$. Furthermore, in this second usage context, each of the users $UT_1, UT_2, \ldots, UT_j, \ldots, UT_M$ is allowed to set elements specific to each terminal that he wishes to use in accordance with his usage preferences, in the same way as the user UT of FIG. 1A.

Figure 2:
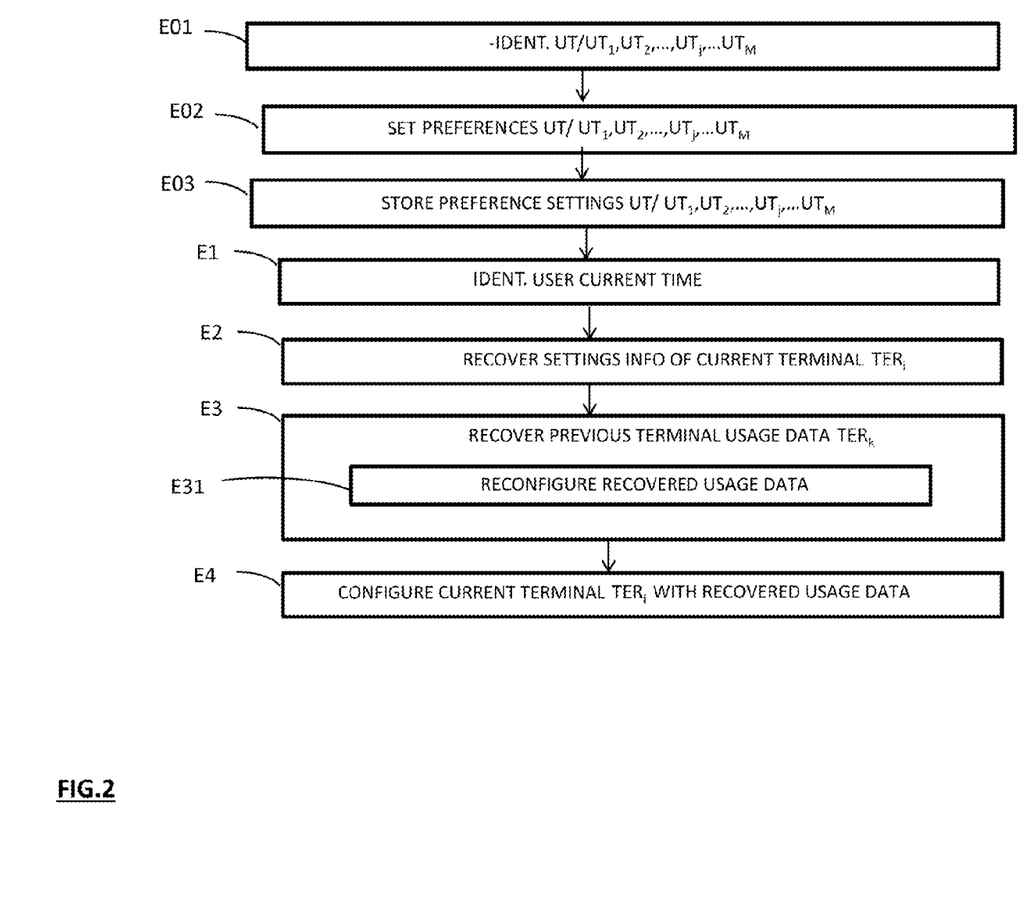
FIG. 2 schematically shows the progress of a method for automatically activating a communication terminal, according to one embodiment of the invention.

With reference to FIG. 2, what are now shown are the steps of the method for automatically activating the configuration of a communication terminal depending on a current user of the terminal, in accordance with one embodiment according to the invention.

In the embodiment that is shown, said automatic activation method is implemented by the device ACT shown in FIG. 5, which device will be described in detail further on in the description.

In a first preliminary step E01 shown in FIG. 2, the user UT (FIG. 1A), and all or some of the users $UT_1$, $UT_2, \ldots, UT_j, \ldots, UT_M$ (FIG. 1B), declares his user identification data in connection with the plurality of terminals $TER_1, TER_2, \ldots, TER_i, \ldots, TER_N$ and sets his usage preferences for the plurality of terminals $TER_1, TER_2, \ldots, TER_i, \ldots, TER_N$.

The declaration of the identification data of a given user with respect to a given terminal consists for example, for the given user, in accessing, via any communication terminal, a dedicated webpage of a site hosted by a service provider offering the service for automatically activating the configuration of a terminal, and in inputting his identification data, either on a terminal-by-terminal basis or for all of the terminals $TER_1, TER_2, \ldots, TER_i, \ldots, TER_N$ or for one or more sets of terminals chosen from among the plurality of terminals $TER_1, TER_2, \ldots, TER_i, \ldots, TER_N$.

In a manner known per se, such identification data contain an identifier of the given user and a password, in association with the terminal to be used.

As a variant, such identification data may be associated with an application or with an application component installed beforehand on each of the terminals liable to be used, which, once activated, makes it possible to identify the given user.

As another variant, such identification data contain the code of the SIM (abbreviation for "subscriber identity module") card of one of the terminals of said plurality of terminals $TER_1, TER_2, \ldots, TER_i, \ldots, TER_N$ that the user preferably uses exclusively or non-exclusively, such as for example a smartphone. Such a code would then make it possible to automatically identify the given user on the other terminals that he wishes to use by virtue of a wireless communication interface (for example Bluetooth, infrared, etc.) installed on these other terminals, which, when the preferred terminal also equipped with a wireless communication interface compatible with the one installed on the other terminals is simply brought close, makes it possible to determine the identification data associated with the preferred terminal and thus to automatically recognize the given user.

As another variant, such identification data are:
data associated with an authentication USB key belonging to the given user,
a barcode displayed on an object of the given user, for example a badge or a bracelet, and identifying the given user from the camera of each terminal $TER_1, TER_2, \ldots, TER_i, \ldots, TER_N$,
biometric data of the given user,
etc.

In a second preliminary step E02 shown in FIG. 2, in association with the user identification data provided previously, for each user in question, the usage preferences for the plurality of terminals $TER_1, TER_2, \ldots, TER_i, \ldots, TER_N$ are set.

To this end, settings information associated with a given user is provided, for example via said user accessing another dedicated webpage of the service provider offering the service for automatically activating the customized configuration of a terminal depending on the user of the terminal. Such settings information consists for example of the selection, by the given user, of recovery rules for the usage data that are generated during use, by the given user, of a terminal under consideration from the plurality of terminals $TER_1, TER_2, \ldots, TER_i, \ldots, TER_N$, or more precisely usage data that are generated either upon activation, by the given user, of elements internal to the terminal under consideration or during use, by the given user, of the Internet access means contained in said terminal under consideration, such as one or more Internet browsers.

As explained further above in the description, such usage data non-exhaustively comprise:
the wallpaper, and/or
the contact list, and/or
contact groups, and/or
the outgoing/received call history, and/or
the outgoing/received SMS message history, and/or
favorite Internet links, and/or
access data for accounts of the user, such as for example authentication information for applications and/or sites of the user, and/or
Internet usage history data generated when using Internet services, such as for example electronic mail, online retail, video on demand, or else generated when browsing the Web.

As these are Internet usage history data, recovering them is intended to improve browsing and download speeds of Internet pages, on the one hand, and to form information for tracking the user on the Web, on the other hand. In a scrolling menu for example, the given user may stipulate:
whether he consents to being tracked on all sites, applications and Internet services,
whether he consents to being tracked only on some sites and/or some applications and/or some Internet services,
whether he does not consent to being tracked on some sites and/or some applications and/or some Internet services.

The settings information may be defined on a terminal-by-terminal basis. In this case, it is necessary to identify each terminal when providing said settings information.

By way of non-limiting example and in a manner known per se, such an identification consists of the code associated with a technical component (chip, or even a SIM card) contained in the terminal under consideration and allowing said terminal to be identified, or else the code of any software component implemented in the terminal under consideration and that would allow said terminal to be identified.

As a variant, the given user could rename the identification of the terminal under consideration with a name that is more intelligible to the given user. For example, if the terminal under consideration is a family tablet whose unique technical identification is for example "HG575Ujg", the given user could manually rename this technical identification as "Home tablet".

As another variant, the settings information may be defined depending on the typology of the terminals under consideration.

In the case for example of FIG. 1A, in which the terminals $TER_1, TER_2, \ldots, TER_i, \ldots, TER_N$ are used exclusively by the user UT, the user UT could select usage data recovery rules that are less constrictive from a confidentiality point of view than if use of the terminals $TER_1, TER_2, \ldots, TER_i, \ldots, TER_N$ were shared. To this end, the user UT selects the following usage data recovery rules in relation thereto:
do not delete Internet usage history data on all of the terminals $TER_1, TER_2, \ldots, TER_i, \ldots, TER_N$, do not delete connections to social network accounts or other accounts that have been established using the terminals $TER_1$, $TER_2$, ..., $TER_i$, ..., $TER_N$.

In the case for example of FIG. 1B, in which use of the terminals $TER_1$, $TER_2$, ..., $TER_i$, ..., $TER_N$ is shared between all or some of the users $UT_1$, $UT_2$, ..., $UT_j$, ..., $UT_M$, a user $UT_j$ under consideration could select usage data recovery rules that are more constrictive from a confidentiality point of view than if he were not sharing use of the terminals $TER_1$, $TER_2$, ..., $TER_i$, ..., $TER_N$. To this end, the user $UT_j$ selects the following usage data recovery rules:

delete Internet usage history data on all of the terminals $TER_1$, $TER_2$, ..., $TER_i$, ..., $TER_N$, delete connections to social network accounts or other accounts established using the terminals $TER_1$, $TER_2$, ..., $TER_i$, ..., $TER_N$.

As a variant, if the user $UT_j$ were to use exclusively one of the terminals $TER_1$, $TER_2$, ..., $TER_i$, ..., $TER_N$, for example the terminal $TER_i$, the user $UT_j$ selects the following usage data recovery rules in relation thereto:

do not delete Internet usage history data on the terminal $TER_i$, delete Internet usage history data on the remaining terminals $TER_1$, $TER_2$, ..., $TER_N$, do not delete connections to social network accounts or other accounts established using the terminal $TER_i$, delete connections to social network accounts or other accounts established using the remaining terminals $TER_1$, $TER_2$, ..., $TER_N$.

According to yet another variant, the settings information could be defined on a finer level than the terminal itself, for example on the browser and/or browsers installed on the terminal or else on the application and/or applications installed on said terminal. To this end, for a terminal under consideration from among the terminals $TER_1$, $TER_2$, ..., $TER_i$, ..., $TER_N$, a given user may define rules for recovering or not recovering usage data generated on a particular browser or else a particular application.

Rather than being provided by the user, the settings information could be provided by default depending on the usage context of a terminal under consideration, for example a terminal used exclusively by a user or else a terminal with shared use.

Of course, the user to whom this settings information that is provided by default relates may make manual changes thereto, via groups of functionalities that are predefined depending on the usage context of the terminals (for example: exclusive or shared use, advertising profiling, anonymity) and depending on the types of desired functionalities that relate to the management of his user accounts, of his applications, and of the various Internet resources that he accesses.

As another variant, the settings information associated with a user could be implicit and masked to this user. For example, for the purpose of automatically and freely protecting his anonymity in some fields, the automatic disconnection of some of his accounts, the deletion of Internet usage data on particular websites, etc. would be predefined by default. Such protection would be to the detriment of the optimization of the advertising profiling of the user in other fields. To this end, the recovery of his usage data on all of the other websites visited by the user would be predefined by default.

In a third preliminary step E03 shown in FIG. 2, the identification data provided in step E01 and the settings information defined in step E02 are recorded in a storage module $MS_1$, as shown in FIGS. 1A and 1B. This may be for example a database of a server SER accessible to the terminals $TER_1$, $TER_2$, ..., $TER_i$, ..., $TER_N$ via the communication network RC.

Variants other than a server accessible on the network would be possible, and describing all of the potential variants does not fall within the aim of this patent application.

However, according to another of the preferred variants, the storage module $MS_1$ could be implemented either in a dedicated terminal (USB key or connected storage bracelet, etc.) or in a terminal with exclusive use selected from among the terminals $TER_1$, $TER_2$, ..., $TER_i$, ..., $TER_N$. The storage module $MS_1$ would then be accessible via a proximity network (for example Bluetooth, infrared link, etc.) between the terminal that contains said storage module $MS_1$ and one of the terminals $TER_1$, $TER_2$, ..., $TER_i$, ..., $TER_N$ liable to be used at a current time by a current user under consideration, so as to allow the identification data and the settings information specific to this current user under consideration to be recovered, so as to implement the steps of the automatic activation method according to the invention that will be described below.

Following the preliminary steps described above, it is now considered that a user wishes to use, at a current time, one of the terminals $TER_1$, $TER_2$, ..., $TER_i$, ..., $TER_N$, for example the terminal $TER_i$. This user, who will be called current user, is either the user UT of FIG. 1A or one of the users $UT_1$, $UT_2$, ..., $UT_j$, ..., $UT_M$ of FIG. 1B.

With reference to FIG. 2, the current user in possession of the terminal, at the current time, is identified at E1.

The identification E1 is implemented depending on the identification data that were provided by the current user in abovementioned step E01 in association with the terminal $TER_i$. According to one example, the user inputs an identifier and a password on a keypad of the terminal $TER_i$.

The settings information, which was predefined by the current user identified at E1, of the terminal $TER_i$ is recovered at E2.

To this end, the database $MS_1$ of FIG. 1A or 1B is interrogated for the purpose of recovering this information on the terminal $TER_i$ and storing said information in a dedicated buffer memory of the terminal $TER_i$.

The usage data of another communication terminal $TER_k$, such that $1 \leq k \leq N$, which terminal was used by the current user before the current time, are recovered at E3 by applying the settings information that was recovered.

The recovery E3 is implemented by extracting these usage data from a storage module $MS_2$ shown in FIG. 1A or 1B, in which these usage data have been stored beforehand. Such a storage module $MS_2$ is for example a database contained in the server SER of FIGS. 1A and 1B. As a variant, the storage module $MS_2$ may be contained in a server different from the server SER or else in one of the terminals $TER_1$, $TER_2$, ..., $TER_i$, ..., $TER_N$ that is considered to be master terminal.

According to the invention, such usage data are respectively associated with actions having been implemented on the previous terminal $TER_k$ by the current user at a time preceding the current time and with the corresponding support means for generating these actions. Each of these actions is stored in association with the time at which it was implemented.

The storage module $MS_2$, regarding the previous terminal $TER_k$, thus has a tracking history of the actions implemented by the current user on this terminal, over the entire duration of use of this terminal, before the user changes terminal and chooses to use the terminal $TER_i$. Non-exhaustively, according to one embodiment, a support means is for example an Internet browser of a certain type and the tracking history consists simply of a browsing history of the current user on the Web using the terminal $TER_k$. According to another example, a support means consists of a cookie specific to a particular website browsed by the current user before the current time, using the terminal $TER_k$, and the tracking history consists of the chronological sequence of URL (abbreviation for "uniform resource locator") links activated by the user before the current time, using the terminal $TER_k$. According to yet another example, a support means consists of a buffer memory of the previous terminal $TER_k$ in which the current user created a contact group before the current time using the terminal $TER_k$ and the tracking history consists of the contact data created over time by the current user using the terminal $TER_k$. According to yet another example, in the most specific case in which the terminal $TER_k$ is a smartphone or a tablet, a support means consists of a cache memory of an application that the user activated before the current time using the terminal $TER_k$ and the tracking history may consist of a set of data kept in this cache memory.

Furthermore, when recovering E3 these usage data, at least some of these data or else all of these data, depending on the usage context under consideration, are configured in a format able to be used by the terminal $TER_i$ at E31. Such an action is necessary if for example:

the terminal $TER_k$ is equipped with an operating system different from that of the terminal $TER_i$, the browsing history is recovered in association with a browser of a first type installed on the terminal $TER_k$, while the terminal $TER_i$ gives priority use to a browser of a second type, the terminal $TER_i$ also being or not being equipped with the browser of the first type.

At E4, the terminal $TER_i$ is configured with the usage data recovered at E3. To this end, the actions associated with the usage data recovered at E3 are replayed on the terminal $TER_i$ transparently for the current user, thereby advantageously allowing the current user to recover all or part of the configuration of the terminal $TER_k$ that he used before the current time.

Such a configuration consists for example in opening, transparently for the current user, his preferred application accounts, after possibly having disconnected users who were already connected previously, in recovering the browsing histories of the current user that were generated on a terminal used previously by said user, and then injecting these browsing histories onto the terminal $TER_i$.

According to one exemplary embodiment, the configuration E4 is implemented in one go, with all of the usage data recovered at E3.

According to another example, to limit the response times necessary to replay all of the actions respectively associated with the recovered usage data, one or more actions are not replayed for as long as the current user does not require them on the terminal $TER_i$.

According to another example, one or more actions are not replayed if the amount of Internet data associated with the mobile tariff of the current user is about to run out or has already run out.

According to yet another example, if the terminal $TER_k$ and the terminal $TER_i$ have the same type of Internet browser and the user activates this Internet browser on the terminal $TER_i$ only at the end of a certain duration after the current time, the recovery of the usage data associated with the Internet browser of the same type from the terminal $TER_k$ is triggered only at the end of said certain duration.

At the end of the method for automatically activating the configuration of the terminal $TER_i$ that has just been described above, the current user is thus able to benefit from continuity of the advertising profiling implemented previously on the terminal $TER_k$ and thus advantageously to continue to benefit from being displayed adverts that correspond to his topics of interest. Such a provision is moreover advantageous for fixed and/or mobile Internet companies, allowing them to significantly increase their advertising revenues.

Figure 3:
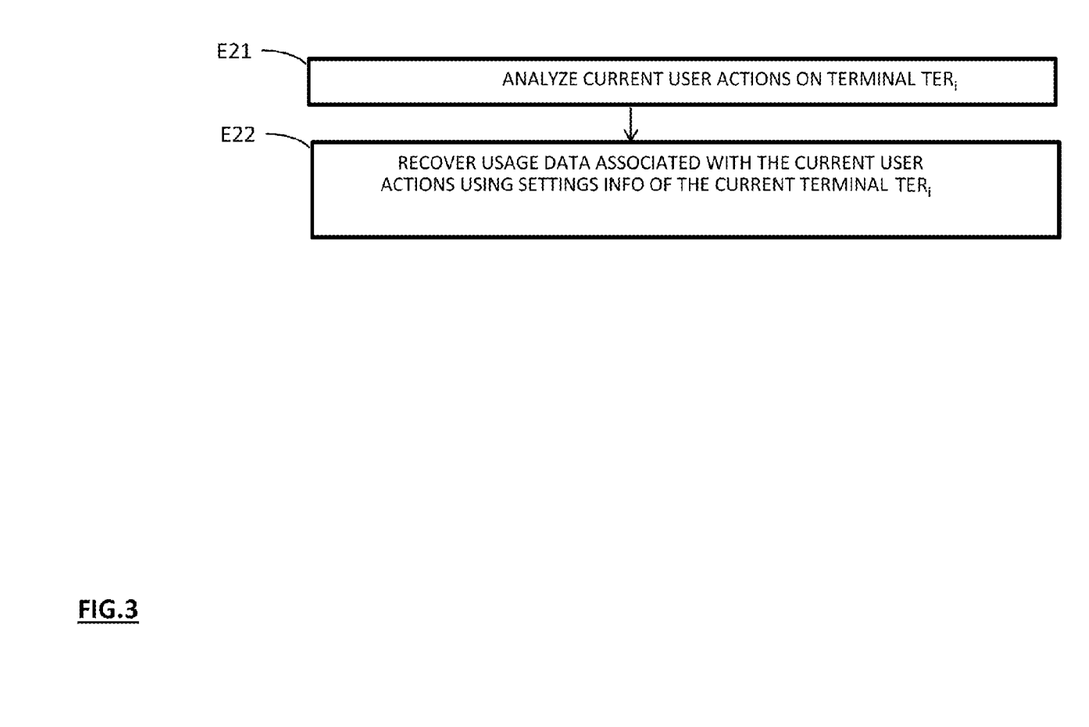
FIG. 3 schematically shows the progress of a method for tracking the use of a communication terminal by a current user.

With reference now to FIG. 3, a description is given of the various actions implemented on the terminal $TER_i$ throughout the entire duration of use of this terminal by the current user, which is between the time of start of use, at which the user is identified by the terminal $TER_i$, and the final time of use, at which the user stops using the terminal for a given duration.

At E21, between the time of start of use and the final time of use, the actions of the current user in relation to the terminal $TER_i$ are analyzed. Non-exhaustively, such actions consist for example:

in changing the wallpaper of the terminal $TER_i$;

in configuring a particular incoming call notification mode on the terminal $TER_i$, such as for example by downloading a ringtone that the current user particularly likes;

in adding a contact to the directory of the terminal $TER_i$;

in installing an application on the terminal $TER_i$;

in browsing the Web using a browser of a given type of the terminal $TER_i$;

in adding a favorite Internet link to the terminal $TER_i$;

etc.

At E22, for a given action, one or more items of usage data corresponding to the given action and to the support means for said given action are recovered or not recovered, in association with the time at which the action was implemented. Recovering or not recovering this and/or these usage data depends on the settings information that was recovered at E2 in FIG. 2.

A timeline is thus created that successively contains the usage data associated with each action of the current user, for which tracking has been requested in the settings information provided by said user.

For example, non-exhaustively, if the terminal $TER_i$ is a smartphone, the activation by the current user of an application installed on said smartphone is referenced on the timeline.

According to another example, each launch and closure of Internet browsers installed on the terminal $TER_i$ is also referenced on said timeline if the current user has requested this (for example for the purpose of optimizing his targeted advertising) in the setting established beforehand at E02, as well as the following actions on these browsers, for the websites mentioned in the setting established beforehand at E02, with indication/retention of the type of setting.

One beneficial variant of the method according to the invention would be, for one and the same user and terminal, to implement tracking on various tracks of the same timeline, respectively of the various types of action of the user in order to access Internet resources using the same terminal $TER_i$.

Such tracks would non-exhaustively consist for example of:

a track linked to the possible use of a browser of a first type, another track linked to the possible use of a browser of a second type, and so on, depending on the number of browsers installed on the terminal that the user has used, a track linked to the possible use of an application of a first type, another track linked to the possible use of an application of a second type, and so on, depending on the number of applications installed on the terminal that the user has activated.

Each track could possibly follow various sequences, possibly discontinuously. This will be the case for example if the current user launches and then closes the same browser several times between the time of start of use and the final time of use of the terminal $TER_i$.

The usage data associated with said actions referenced on the timeline or the various tracks of the timeline are recorded in the storage module $MS_2$ that was described further above in the description with reference to FIGS. 1A and 1B. There is thus centralized tracking of all or some of the actions of the current user on the terminal $TER_i$, depending on the settings information predefined by said user at E02.

As a variant, a blank timeline would simply be created and the various actions of the current user would be accessed via the means that are already in place on the applications and browsers of the terminal $TER_i$, on the condition however that said actions are timestamped, so as to be able to correlate the timestamp of the created timeline and the timestamps generated by said means that are already in place. Non-exhaustively, such a means that is already in place consists of a browsing history generated by an Internet browser installed on the terminal $TER_i$ and that timestamps each URL link that is looked up. However, in practice, this would involve the various terminals $TER_1$, $TER_2$, . . . , $TER_i$, . . . , $TER_N$ each having access to the data of the other terminals in order to recover said data. To this end, the storage module $MS_2$ in which the usage data of the current user are recorded in association with the actions of said user on the terminal $TER_i$ is preferably installed on a remote server, or as a variant on a device accessible from the various terminals $TER_1$, $TER_2$, . . . , $TER_i$, . . . , $TER_N$, as was already mentioned further above in the description.

In practice, combinations of these various variants for tracking the actions of the current user on the terminal $TER_i$ would be possible.

In a usage context such as the one illustrated in FIG. 1B in which the terminal $TER_i$ is liable to be shared, resources, such as for example the accounts, applications and/or Internet services that the current user accessed using the terminal $TER_i$ between the start and end of usage times are disconnected, and the usage data, such as for example the traces and/or connection histories of the current user, are deleted from the terminal $TER_i$.

In a usage context such as the one illustrated in FIG. 1A in which the terminal $TER_i$ is used exclusively by the current user, here UT, such disconnection and such deletion are not necessary.

Figure 4:
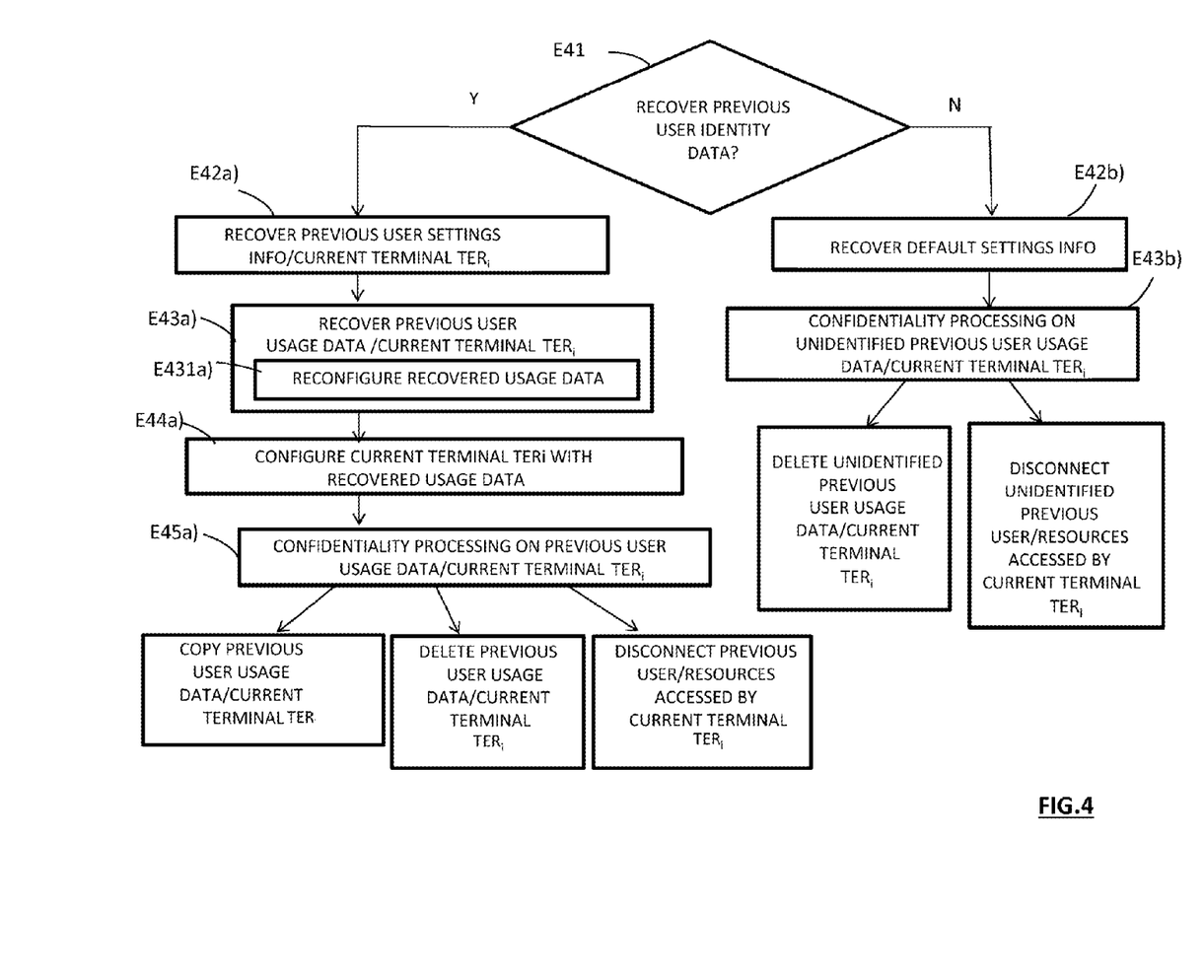
FIG. 4 schematically shows the progress of a method for automatically activating a communication terminal, according to another embodiment of the invention.

With reference now to FIG. 4 and FIG. 1B, a description is given of a method for automatically activating the configuration of the terminal $TER_i$ if a previous user, different from the current user, has used the terminal $TER_i$ before the current time.

At E41, the terminal $TER_i$ checks whether the storage module $MS_2$ has recorded, before the current time, identification data associated with a user having used the terminal $TER_i$ before the current time.

If this is the case, the settings information, which is associated with the previous user identified at E41, of the terminal $TER_i$ is recovered at E42a).

To this end, the database $MS_1$ of FIG. 1B is interrogated for the purpose of recovering this information on the terminal $TER_i$ and storing said information in a dedicated buffer memory of the terminal $TER_i$. To guarantee the confidentiality of this information with regard to the current user, said buffer memory is not made accessible to the current user. As a variant, if a buffer memory is common to the current user and to the previous user, the settings information associated with the previous user is recorded in a storage space to which the current user does not have access. Access to such a storage space may be locked for example by virtue of a decryption key.

The usage data of the communication terminal $TER_i$ that was used by the previous user before the current time are recovered at E43a), similarly to step E3 of FIG. 2, by applying the settings information that was recovered at E42a).

The recovery E43a) is implemented by extracting these usage data from the storage module $MS_2$ of FIG. 1B, in which these usage data have been stored beforehand.

Similarly to what has already been explained further above in the description, such usage data are respectively associated with actions having been implemented on the terminal $TER_i$ by the previous user at a time preceding the current time and with the corresponding support means for generating these actions. Each of these actions is stored in the storage module $MS_2$ in association with the time at which it was implemented.

Similarly to step E31 of FIG. 2, when recovering E43a) these usage data, at least some of these data or else all of these data, depending on the usage context under consideration, are configured in a format able to be used by the terminal $TER_i$ at E431a).

At E44a), the terminal $TER_i$ is configured using the usage data recovered at E43a), which results in the terminal $TER_i$ being configured in the operating state in which it was when the previous user finished using it at a time preceding the current time. Such a configuration is implemented similarly to step E4 of FIG. 2 and, for this reason, will not be described in detail again.

To guarantee the confidentiality of the usage data of the previous user with regard to the current user, the buffer memory in which these data are recorded is not made accessible to the current user. As a variant, if a buffer memory is common to the current user and to the previous user, the usage data associated with the previous user are recorded in a storage space to which the current user does not have access. Access to such a storage space may be locked for example by virtue of a decryption key.

At E45a), confidentiality processing is applied to the recovered usage data depending on the settings information recovered at E42a). Such processing implements the following:

copying all or some of said usage data recovered at E43a) into a storage space associated with the previous user, and/or deleting all or some of said usage data recovered at E43a) from said terminal $TER_i$, and/or disconnecting the previous user from all or some of the secure resources that the previous user accessed using the terminal $TER_i$.

With regard to the copying action, this may involve for example the Internet usage history of the previous user, which may thus be reused on the terminal $TER_i$ once the current user has finished using it after the final time or else on another terminal.

With regard to the deletion action, this may also involve the Internet usage history of the previous user in relation to the terminal $TER_i$.

With regard to the disconnection action, this may involve all of the accounts of the previous user, whether these are kept on the Internet browsers with regard to the corresponding websites, for example on specific cookies of the services in question, or on corresponding applications (on the cache of said applications for example).

According to one possible embodiment, all or some of the usage data in relation to the previous user may have been stored directly in the terminal TER; in association with the Internet service(s), the application(s) or the software in relation to which these usage data were generated, for example in corresponding cache memories. Therefore, in such a situation, the confidential processing will for example consist, non-exhaustively, in:

accessing the storage space for the Web browsing history of the previous user with regard to the terminal $TER_i$ and the cache of this browser, recovering the histories concerned by the previous user in accordance with the settings information recovered at E42a), applying said settings to the histories in question, for example deleting from the histories the Internet traces corresponding to the use of the terminal $TER_i$ by the previous user, excluding the other traces, after having copied them beforehand into the storage module $MS_2$ of FIG. 1B.

According to another example, the confidential processing will consist, for the usage data generated when activating an autonomous application installed on the terminal $TER_i$ and that the previous user may have used before the current time, in accessing, without opening said application, the buffer storage space of said application, possibly using a decryption key provided by an API (abbreviation for "application programming interface") of said application, and then in deleting the corresponding usage data.

If no item of identification data in relation to a previous user of the terminal $TER_i$ is recorded in the storage module $MS_1$ at E41, settings information established beforehand by default is recovered at E42b).

At E43b), confidentiality processing is then applied, on the terminal $TER_i$, to the usage data associated with the previous user who has not been identified, depending on the settings information recovered at E42b). By way of non-exhaustive example, such processing implements the following:

deleting all or some of said usage data associated with the previous user, such as for example the Internet histories of the browsers used by said user before the current time, from said terminal $TER_i$, and/or disconnecting the unidentified previous user from all or some of the secure or unsecure resources that the previous user accessed using the terminal $TER_i$ before the current time. This may involve for example accounts belonging to the unidentified previous user that he accessed before the current time, or else applications that are still open at the current time.

In the following particular cases, usage data associated with the previous user are not recovered:

the terminal $TER_i$ is a terminal used exclusively by the current user, such as in the case of FIG. 1A, and the previous user was using a shared terminal before the current time, the current user is the first user of the terminal $TER_i$ that is shared between the users $UT_1$, $UT_2$, ..., $UT_j$, ..., $UT_M$ of FIG. 1B, or, as a variant, the current user is the first user since resetting of the histories of the terminal $TER_i$ that is shared between the users $UT_1$, $UT_2$, ..., $UT_j$, ..., $UT_M$ of FIG. 1B.

At the end of the actions that have just been described above, with reference again to FIG. 2:

at E2, the settings information of the current user with regard to the terminal $TER_i$ is recovered, at E3, the usage data of the current user with regard to a previous terminal $TER_k$ is recovered by applying the settings information recovered at E2, possibly at E31, the recovered usage data are reconfigured in a format compatible with that of the terminal $TER_i$, at E4, the current terminal $TER_i$ is reconfigured with the usage data recovered at E3 or possibly reconfigured at E31.

The steps that have just been described above with reference to FIGS. 2 and 4 make it possible to achieve an automatic configuration of the terminal $TER_i$ in the possession of the current user at a current time, the aim of which is to continue the optimum targeted advertising experience with regard to the current user, on the one hand, and to preserve the privacy functionalities with regard to the previous user of the current terminal $TER_i$, on the other hand.

Of course, the recovery E3 of the usage data is implemented depending on the settings of the current user.

If for example said current user has not requested in his settings to continue his targeted advertising in the event of changing terminal, step E3 will not be implemented.

Furthermore, the recovery E3 of said usage data of the current user on the terminal or terminals that he has used previously of course implies that his previous usages have been retained beforehand in the storage module $MS_2$.

According to one exemplary embodiment, the recovery of the usage data of the current user consists in recovering the list of his actions referenced in the various tracks of the timeline created in step E22 of recovering the usage data as shown in FIG. 3, said timeline being bounded between the time of start of use and the time of end of use of the terminal $TER_i$ by the current user.

This recovery depends on the implementation variants described above: for example based directly on the actions referenced on said timeline, or else on the pre-existing means of the terminal $TER_i$ depending on the time limits of the timeline, the action timestamps on these pre-existing means having to correspond to the time range defined by the timeline created at E22 in FIG. 3.

With regard to the configuration E4 of the terminal $TER_i$ with the usage data, recovered at E3, of the current user, this has already been described further above in the description with reference to FIG. 2 and, for these reasons, will not be described in detail again. With regard to the objective of non-disclosure of the personal information of the current user in the context in which the terminal $TER_i$ is shared between a plurality of users, if, in the list of the actions referenced on the timeline and associated with the actions of the current user, there appears an action such as a connection to a secure resource for which the user has requested, in his settings, disconnection at the end of use of the terminal TER$_i$, the configuration E4 consists in disconnecting the current user from this resource, as well as deleting the usage data, such as for example the traces and/or connection histories of the current user to this resource, from the terminal TER$_i$.

With regard to the objective of adapting the personal information of the current user to the terminal TER$_i$, all of the accounts of the current user will be reconnected in one go or else on a case-by-case basis, that is to say when the current user activates a given application, connects to a given secure website, etc. using the terminal TER$_i$.

With regard to optimizing the targeted advertising of the current user, the usage data recovered at E3 are reinjected into the terminal TER$_i$, for example through simple copying.

If these usage data correspond to actions referenced on various tracks of a timeline created in association with the use, by the current user, of one or more terminals, before the current time, timestamped traces on a browser of the same type installed in the terminal or terminals used previously by the current user are for example copied into the browser of a given type of the terminal TER$_i$, or else to a cookie of this browser. These timestamped traces are then copied with their original timestamp.

Generally speaking, steps E43$a$), E44$a$), E45$a$), E3, E4, or else steps E42$b$), E43$b$), E3, E4 are generally applied simultaneously, and not one after another. For example, with regard to the cache of any Internet browser of the current terminal TER$_i$, the browsing histories corresponding to the timeline created in relation to the previous user would be deleted and replaced with those corresponding to the timeline created in relation to the current user with regard to the use, by said current user, of one or more terminals before the current time. It should moreover be noted that the time range representative of the sequence of user actions over time and contained in the deleted timeline may be different from the time range representative of the sequence of user actions over time and contained in the replacement timeline.

One specific case would be that in which the current user would be the main user of the terminal TER$_i$ and of another terminal TER$_k$. This may be the case if for example the terminal TER$_i$ is a terminal used exclusively by the current user, and the terminal TER$_k$ is a terminal shared between a plurality of users, the current user alternately performing actions on these two terminals, by applying corresponding settings. In such a situation, the time range representative of the sequence of user actions over time and contained in the timeline created in association with the use, by the current user, of the terminal TER$_i$ would then be matched to the time range representative of the sequence of user actions over time and contained in the timeline created in association with the use, by the current user, of the terminal TER$_k$. At the end of this matching, the newly created timeline in the terminal TER$_i$ would then have:

- a timestamped start time as the start time of the time range representative of the sequence of user actions over time and contained in the timeline created in associated with the use, by the current user, of the terminal TER$_i$,
- a timestamped end time as the end time of this time range.

The usage data referenced on these two different timelines may then be merged on the newly created timeline in the terminal TER$_i$ on the basis of their respective timestamps, or, as a more elaborate variant, be merged on identical tracks of the newly created timeline in the terminal TER$_i$ (for example: track corresponding to a browser of a first type, track corresponding to a browser of a second type, etc.).

Figure 5:
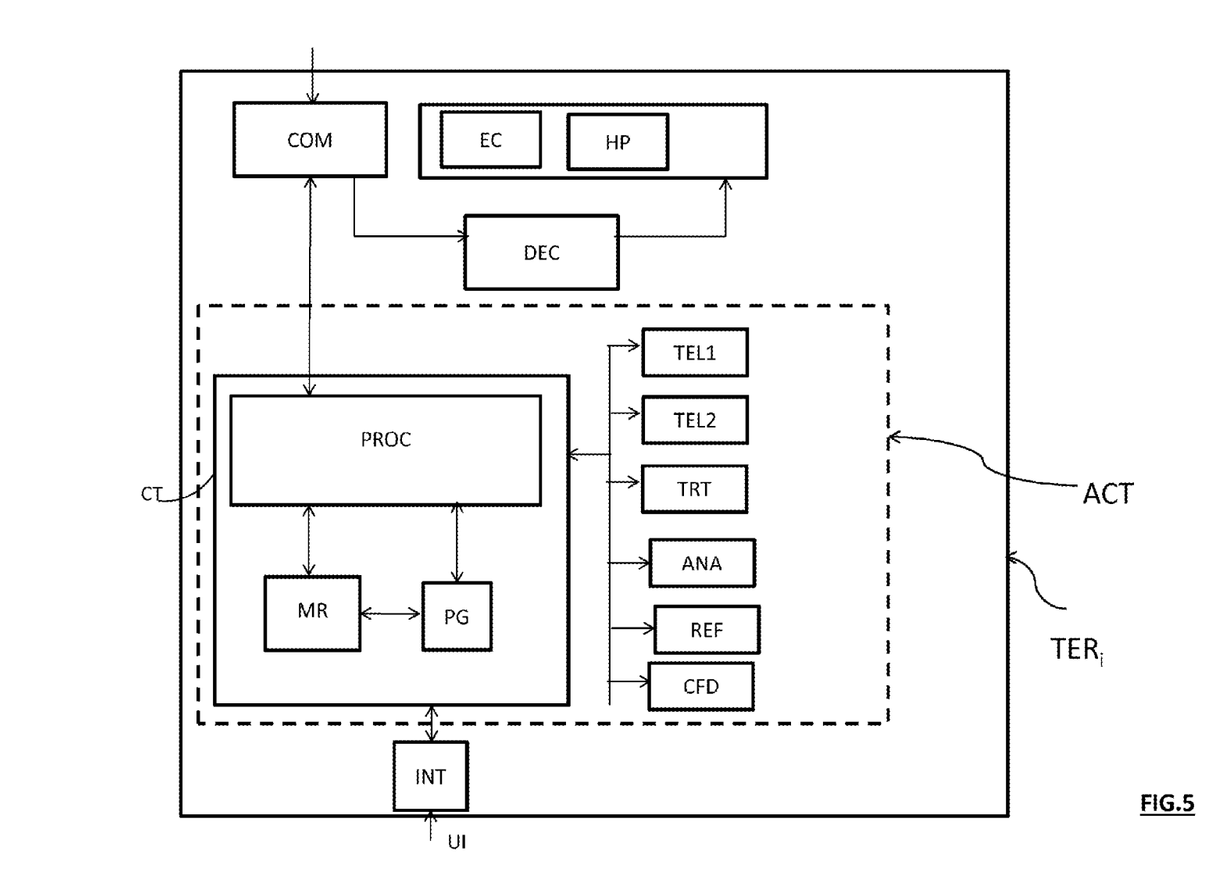
FIG. 5 shows the simplified structure of a device for automatically activating the configuration of a communication terminal according to one embodiment of the invention.

With reference now to FIG. 5, a description is given of the simplified structure of the device ACT for automatically activating the configuration of a terminal TER$_i$, according to one exemplary embodiment of the invention.

The device ACT is contained in a communication terminal of the type mentioned further above in the description, for example a smartphone here.

In a manner known per se, the communication terminal TER$_i$ comprises:

- a communication interface COM that is designed to communicate, via the communication network RC of FIGS. 1A and 1B, in accordance for example with the HTTP (abbreviation for "Hypertext Transfer Protocol") protocol,
- a module INT for processing user interactions UI,
- a display screen EC,
- a speaker HP,
- an interface DEC for the audio/video decoding of text, audio, video or audiovisual content, said interface being designed to transmit the decoded signals to the screen EC or to the speaker HP.

The device ACT comprises physical and/or software resources, in particular a processing circuit CT for implementing the automatic activation method as shown in FIGS. 2 to 4.

The processing circuit CT contains a processor PROC driven by a computer program PG.

On initialization, the code instructions of the computer program PG are for example loaded into a RAM memory, denoted MR, before being executed by the processing circuit CT.

According to the invention, the device ACT also comprises:

- a download module TEL1 designed to download, to the terminal TER$_i$, from the storage module MS$_1$:
  - the settings information of the current user and/or of a previous user having used the terminal TER$_i$ before the current time,
  - the identification data of the previous user, if said user is authenticated,
- a download module TEL2 designed to download, to the terminal TER$_i$, from the storage module MS$_2$ or a buffer memory (not shown) of the terminal TER$_i$, the usage data of the current user in relation to a terminal used by said user before the current time or else the usage data of the previous user who used the terminal TER$_i$ before the current time,
- a processing module TRT designed to configure the terminal TER$_i$ with the recovered usage data,
- a module ANA for analyzing the actions of the current user of the terminal TER$_i$,
- a referencing module REF designed to temporally reference the analyzed actions, depending on the settings information of the current user,
- a management module CFD designed to apply confidentiality processing to the usage data of the previous user who used the terminal TER; before the current time.

The modules TEL1, TEL2, TRT, ANA, REF and CFD are driven by the processor PROC of the processing circuit CT.

It goes without saying that the embodiments described above have been given purely by way of completely non-limiting indication, and that numerous modifications may be easily made by a person skilled in the art without otherwise departing from the scope of the invention.

The invention claimed is:

1. A method for automatically activating a configuration of a communication terminal that is customized depending on a current user of the terminal, wherein the method comprises the following acts performed by a device:

identifying, at a current time, the current user in possession of said terminal, recovering at least one item of settings information of said terminal, said at least one item of settings information defining a recovery rule of at least one item of usage data, recovering said at least one item of usage data of at least one communication terminal having been used by said current user before the current time, depending on said recovery rule, configuring said terminal that the current user has in possession with said at least one recovered item of usage data depending on said recovery rule, in response to a previous user, different from the current user, having used the terminal before the current time, implementing:

recovering at least one item of settings information, associated with the previous user, of said terminal, recovering at least one item of usage data of said terminal having been used by said previous user, depending on said at least one recovered item of settings information, associated with the previous user, of said terminal, and applying confidentiality processing to said at least one recovered item of usage data of said terminal having been used by said previous user, depending on said at least one recovered item of settings information, associated with the previous user, of said terminal, which comprises, for each item of usage data, having been used by said previous user and that has been recovered, of said terminal:

selecting the item of usage data from settings information, associated with the previous user, of said terminal, configuring said terminal with said selected item of usage data in an operating state in which the terminal was when the previous user finished using the terminal at a time preceding the current time, only if the use of one and the same item of usage data of the terminal is required by the current user, and applying the confidentiality processing to said selected item of usage data.

2. The method as claimed in claim 1, wherein, throughout the entire duration of use of the terminal by the current user, the following is implemented:

analyzing actions of the current user in relation to said terminal, for a given action, recovering or not recovering an item of usage data of said terminal corresponding to said given action and to support elements for said action, in association with the time at which the action was implemented, depending on said recovery rule.

3. The method as claimed in claim 1, wherein, when the previous user has been identified before the recovery of said at least one item of settings information, associated with the previous user, of said terminal, said at least one recovered item of settings information, associated with the previous user, of said terminal, is an item of information predefined by said previous user.

4. The method as claimed in claim 1, wherein, when the previous user has not been identified before the recovery of said at least one item of settings information, associated with the previous user, of said terminal, said at least one item of settings information associated with the previous user is established beforehand by default.

5. The method as claimed in claim 1, wherein the confidentiality processing applied to said at least one recovered item of usage data of the previous user implements the following:

copying all or some recovered usage data of said terminal having been used by said previous user into a storage space associated with the previous user, and/or deleting all or some recovered usage data of said terminal having been used by said previous user, from said terminal, and/or disconnecting the previous user from all or some of the secure resources that the previous user accessed.

6. The method as claimed in claim 1, wherein, for any current or previous user under consideration, when recovering the usage data, at least some usage data are configured in a format that is able to be used by the terminal at the current time.

7. The method as claimed in claim 1, wherein, for any current or previous user under consideration, the settings information associated with said user under consideration differs according to a type of terminal liable to be used by said user under consideration.

8. A device for automatically activating a configuration of a communication terminal that is customized depending on a current user of the terminal, said device comprising:

a processing circuit configured to:

identify, at a current time, the current user in possession of said terminal, recover at least one item of settings information of said terminal, said at least one item of settings information defining a recovery rule of at least one item of usage data, recover said at least one item of usage data of at least one communication terminal having been used by said current user before the current time, depending on said recovery rule, configure said terminal that the current user has in possession with said at least one recovered item of usage data depending on said recovery rule, in response to a previous user, different from the current user, having used the terminal before the current time, implement:

recovering at least one item of settings information, associated with the previous user, of said terminal, recovering at least one item of usage data of said terminal having been used by said previous user, depending on said at least one recovered item of settings information, associated with the previous user, of said terminal and applying confidentiality processing to said at least one recovered item of usage data of said terminal having been used by said previous user, depending on said at least one recovered item of settings information, associated with the previous user, of said terminal, which comprises, for each item of usage data, having been used by said previous user and that has been recovered, of said terminal:

selecting the item of usage data from settings information, associated with the previous user, of said terminal, configuring said terminal with said selected item of usage data in an operating state in which the terminal was when the previous user finished using the terminal at a time preceding the current time, only if the use of one and the same item of usage data of the terminal is required by the current user, and applying the confidentiality processing to said selected item of usage data.

9. The device as claimed in claim 8, wherein the device is comprised in the communication terminal.

10. A non-transitory computer-readable recording medium on which there is recorded a computer program comprising program code instructions for executing when said program is executed by a computer, wherein the program code instructions configure the computer to perform acts comprising:
- automatically activating a configuration of a communication terminal that is customized depending on a current user of the terminal, wherein the activating comprises:
- identifying, at a current time, the current user in possession of said terminal,
- recovering at least one item of settings information of said terminal, said at least one item of settings information defining a recovery rule of at least one item of usage data,
- recovering said at least one item of usage data of at least one communication terminal having been used by said current user before the current time, depending on said recovery rule,
- configuring said terminal that the current user has in possession with said at least one recovered item of usage data depending on said recovery rule,
- in response to a previous user, different from the current user, having used the terminal before the current time, implementing:
  - recovering at least one item of settings information, associated with the previous user, of said terminal,
  - recovering at least one item of usage data of said terminal having been used by said previous user, depending on said at least one recovered item of settings information, associated with the previous user, of said terminal, and
  - applying confidentiality processing to said at least one recovered item of usage data of said terminal having been used by said previous user, depending on said at least one recovered item of settings information, associated with the previous user, of said terminal, which comprises, for each item of usage data, having been used by said previous user and that has been recovered, of said terminal:
    - selecting the item of usage data from settings information, associated with the previous user, of said terminal,
    - configuring said terminal with said selected item of usage data in an operating state in which the terminal was when the previous user finished using the terminal at a time preceding the current time, only if the use of one and the same item of usage data of the terminal is required by the current user, and
    - applying the confidentiality processing to said selected item usage data.

\* \* \* \* \*